(12) United States Patent
Martin et al.

(10) Patent No.: US 9,149,994 B2
(45) Date of Patent: Oct. 6, 2015

(54) SYSTEMS FOR MOLDING NON-PNEUMATIC TIRES

(71) Applicant: Caterpillar Inc., Peoria, IL (US)

(72) Inventors: Kevin L. Martin, Washburn, IL (US); Aaron K. Amstutz, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 390 days.

(21) Appl. No.: 13/712,442

(22) Filed: Dec. 12, 2012

(65) Prior Publication Data
US 2014/0159280 A1 Jun. 12, 2014

(51) Int. Cl.
*B29D 30/02* (2006.01)
*B29C 33/42* (2006.01)
*B29C 33/56* (2006.01)
*B29C 33/00* (2006.01)
*B29C 33/40* (2006.01)
*B29C 33/76* (2006.01)

(52) U.S. Cl.
CPC ............ *B29D 30/02* (2013.01); *B29C 33/0033* (2013.01); *B29C 33/405* (2013.01); *B29C 33/42* (2013.01); *B29C 33/56* (2013.01); *B29C 33/76* (2013.01)

(58) Field of Classification Search
None
See application file for complete search history.

(56) References Cited

U.S. PATENT DOCUMENTS

| | | |
|---|---|---|
| 1,587,577 A | 6/1926 | Beitel |
| 2,351,529 A | 6/1944 | Luxenberger et al. |
| 5,042,544 A | 8/1991 | Dehasse |
| 5,343,916 A | 9/1994 | Duddey et al. |
| 5,676,900 A | 10/1997 | Pajtas |
| 6,681,822 B2 | 1/2004 | Adams et al. |
| 7,174,936 B2 | 2/2007 | Becker et al. |
| 7,393,491 B2 | 7/2008 | Moore et al. |
| 7,566,213 B2 | 7/2009 | Nguyen et al. |
| 8,061,398 B2 | 11/2011 | Palinkas et al. |
| 8,555,941 B2 * | 10/2013 | Perron et al. ................... 152/326 |
| 2009/0107596 A1 * | 4/2009 | Palinkas et al. ............ 152/209.1 |
| 2012/0038206 A1 | 2/2012 | Chadwick et al. |
| 2014/0034219 A1 * | 2/2014 | Chadwick et al. ............ 156/113 |

FOREIGN PATENT DOCUMENTS

| | | |
|---|---|---|
| CH | 356594 | 8/1961 |
| EP | 0688647 | 12/1995 |
| EP | 1344619 | 9/2003 |
| EP | 2418098 | 2/2012 |
| FR | 2546814 | 12/1984 |
| JP | S59220345 | 12/1984 |
| WO | 2009055670 | 4/2009 |

* cited by examiner

*Primary Examiner* — Benjamin Schiffman
(74) *Attorney, Agent, or Firm* — Finnegan, Henderson, Farabow, Garrett & Dunner, LLP

(57) ABSTRACT

A system for molding a non-pneumatic tire includes a lower mold portion including a lower backing plate, a plurality of lower projections extending from the lower backing plate, and a plurality of lower sleeves configured to at least partially cover the lower projections. The system further includes at least one lower retention plate configured to be positioned proximate the lower backing plate and retain the lower sleeves on the lower projections. The system also includes an upper mold portion configured to be associated with the lower mold portion. The system further includes an upper backing plate, a plurality of upper projections extending from the upper backing plate, and a plurality of upper sleeves configured to at least partially cover the upper projections. The system also includes at least one upper retention plate configured to be positioned proximate the upper backing plate and retain the upper sleeves on the upper projections.

15 Claims, 11 Drawing Sheets

SYSTEMS FOR MOLDING NON-PNEUMATIC TIRES

TECHNICAL FIELD

The present disclosure relates to systems and methods for molding parts, and more particularly, to systems and methods for molding non-pneumatic tires.

BACKGROUND

When forming parts by molding, it is sometimes desirable to be able to form relatively small or intricate features in the part being molded. However, such features may result in difficulty separating portions of the mold from the molded part following curing of the molding material inside the mold. This difficulty may be particularly pronounced if the features extend relatively deeply into the molded part or if the molded part is particularly large. In such cases, it may be necessary to design the mold so that it has relatively large draft angles to facilitate removal of the molded part from the mold following curing of the molding material. However, large draft angles may be inconsistent with the desired design of the molded part.

For example, non-pneumatic tires may be formed by molding. However, some molded non-pneumatic tires may be typically less compressible than similar-sized pneumatic tires. This reduced compressibility may render the non-pneumatic tires unsuitable for some desired uses. However, it is possible to increase the compressibility of some non-pneumatic tires by creating axially-extending cavities in the tires between the tread and the hub. As a result, it may be desirable to provide a mold for forming tires having cavities between the tread and hub. However, it may be difficult to remove a molded tire from a mold having structures for forming the cavities in the tires as a result of the increased surface area of contact between the mold and the molded tire, particularly when the tire is large or there are a relatively large number of cavities having a relatively small cross-section compared to the length of the cavities. As a result, it may be difficult to mold such a tire.

An example of a mold and method for forming a non-pneumatic tire is disclosed in U.S. Patent Application Publication No. US 2012/0038206 A1 to Chadwick et al. ("the '206 publication"). In particular, the '206 publication discloses fabricating a non-pneumatic tire and wheel assembly by casting with a pour molding process. An outer mold element is received within a preformed tread. The outer mold element extends from a flat plate and incorporates struts corresponding to spoke locations in the tire body element and includes apertures to receive rubber mold blocks. An inner mold element is concentrically received over the tread and incorporates struts and apertures symmetrical with the outer mold element. Rubber casting blocks are inserted through the apertures in the inner mold element and received in corresponding apertures in the outer mold element to complete the casting mold. Sizing of the struts and apertures in the outer and inner mold elements and the rubber casting blocks provides corresponding sizing of the spokes in the cast tire body element. Elastomeric material is introduced through fill tubes to completely fill the interstitial spaces between the rubber mold blocks, is allowed to cure, and the rubber mold blocks and inner and outer mold elements are removed.

Although the mold and method disclosed in the '206 publication permits spokes to be molded into a molded tire, the mold and method may suffer from a number of possible drawbacks. For example, the method may be undesirably complex and lack efficiency due to the need to manually insert the rubber mold blocks into the inner and outer mold elements. In addition, the use of the rubber mold blocks may limit the ability to mold certain desired features into the molded tire.

The systems and methods disclosed herein may be directed to mitigating or overcoming one or more of the possible drawbacks set forth above.

SUMMARY

In one aspect, the present disclosure is directed to a system for molding a non-pneumatic tire. The system includes a lower mold portion including a lower backing plate and a plurality of lower projections extending from the lower backing plate. The lower projections are arranged in a first predetermined pattern to correspond to a pattern of cavities in a first side of the tire. The lower mold portion also includes a plurality of lower sleeves configured to at least partially cover the lower projections. The lower sleeves have an external surface and an internal recess having an internal surface, wherein the internal surface of the lower sleeves is shaped substantially similar to an external surface of the lower projections, and the external surface of the lower sleeves corresponds substantially to an external surface of the cavities in the first side of the tire. The lower mold portion further includes at least one lower retention plate configured to be positioned proximate the lower backing plate and retain the lower sleeves on the lower projections. The system also includes an upper mold portion configured to be associated with the lower mold portion. The upper mold portion includes an upper backing plate and a plurality of upper projections extending from the upper backing plate. The upper projections are arranged in a second predetermined pattern to correspond to a pattern of cavities in a second side of the tire. The upper mold portion also includes a plurality of upper sleeves configured to at least partially cover the upper projections. The upper sleeves have an external surface and an internal recess having an internal surface, wherein the internal surface of the upper sleeves is shaped substantially similar to an external surface of the upper projections, and the external surface of the upper sleeves corresponds substantially to an external surface of the cavities in the second side of the tire. The upper mold portion further includes at least one upper retention plate configured to be positioned proximate the upper backing plate and retain the upper sleeves on the upper projections.

In another aspect, a mold assembly for molding a non-pneumatic tire includes a lower mold portion. The lower mold portion includes a lower backing plate and a plurality of lower projections extending from the lower backing plate, wherein the lower projections are arranged in a first predetermined pattern to correspond to a pattern of cavities in a first side of the tire. The lower mold portion also includes a plurality of lower sleeves configured to at least partially cover the lower projections. The lower sleeves have an external surface and an internal recess having an internal surface, wherein the internal surface of the lower sleeves is shaped substantially similar to an external surface of the lower projections, and the external surface of the lower sleeves corresponds substantially to an external surface of the cavities in the first side of the tire. The lower mold assembly further includes at least one lower retention plate configured to be positioned proximate the lower backing plate and retain the lower sleeves on the lower projections. The mold assembly also includes an upper mold portion associated with the lower mold portion, and a hub between the lower mold portion and the upper mold portion. The mold assembly further includes a circular barrier between the lower mold portion and the upper mold portion, wherein the hub and the circular barrier provide respective seals between the lower mold portion and the upper mold portion.

In a further aspect, a method for molding a non-pneumatic tire includes providing a lower mold portion including a lower backing plate and a plurality of lower projections extending from the lower backing plate. The lower mold portion also includes a plurality of lower sleeves at least partially covering the lower projections, and at least one lower retention plate positioned proximate the lower backing plate and retaining the lower sleeves on the lower projections. The method also includes associating an upper mold portion with the lower mold portion to form a mold assembly having an interior. The upper mold portion includes an upper backing plate and a plurality of upper projections extending from the upper backing plate toward the lower projections when the upper mold portion is associated with the lower mold portion. The upper mold portion also includes a plurality of upper sleeves at least partially covering the upper projections, and at least one upper retention plate positioned proximate the upper backing plate and retaining the upper sleeves on the upper projections. The method further includes supplying a molding material to the interior of the mold assembly such that the molding material substantially surrounds the plurality of lower sleeves and the plurality of upper sleeves.

DETAILED DESCRIPTION

Figure 1:
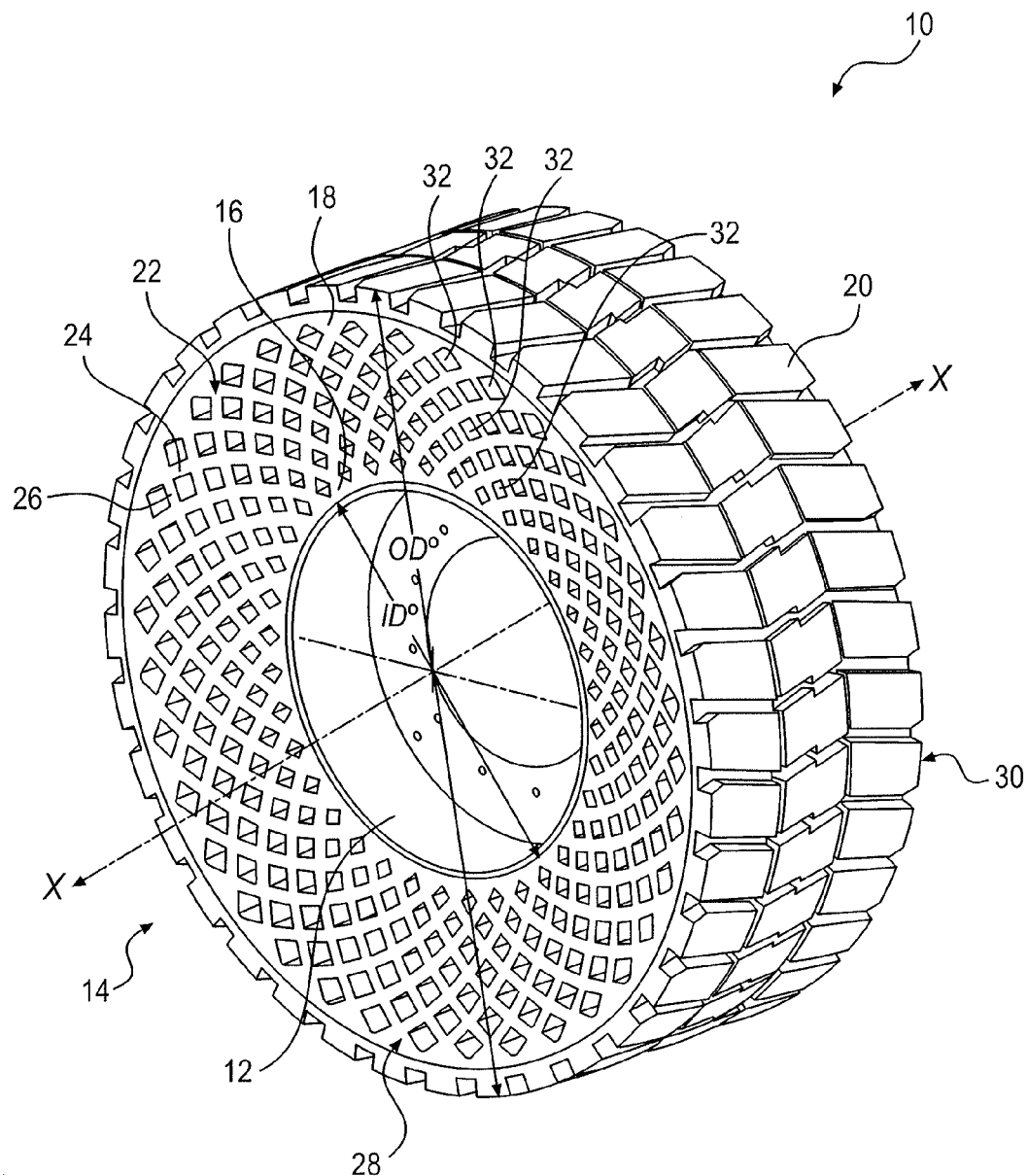
FIG. 1 is a perspective view of an exemplary embodiment of a molded tire.
Figure 2:
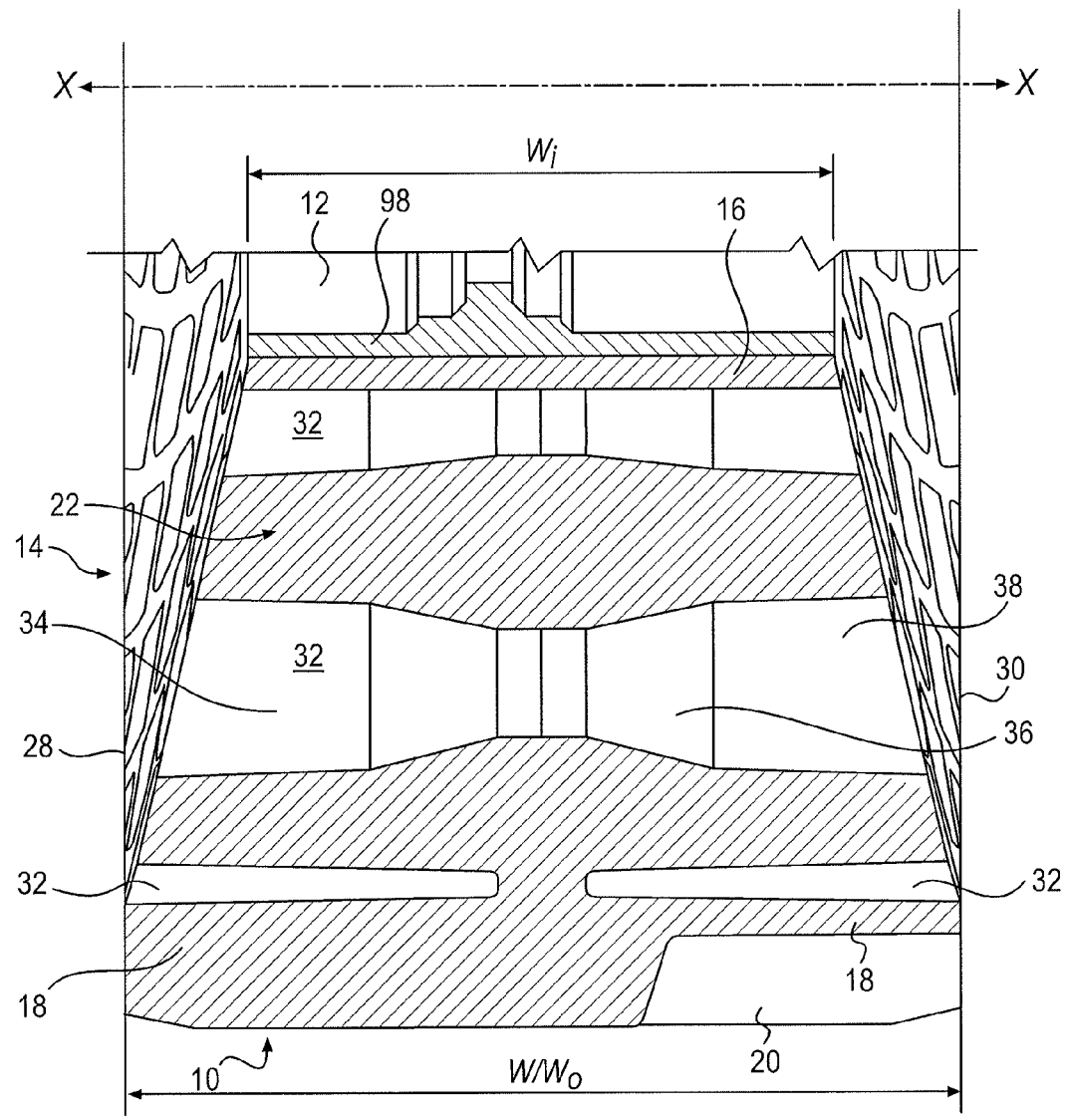
FIG. 2 is a partial section view of an exemplary embodiment of a molded tire.

FIGS. 1 and 2 show an exemplary embodiment of a wheel 10. Wheel 10 may be used on a machine configured to travel across terrain, such as, for example, an automobile, a truck, an agricultural vehicle, and/or a construction vehicle, such as, for example, a wheel loader, a dozer, a skid-steer loader, an excavator, a grader, an on-highway truck, an off-highway truck, and/or any other vehicle type known to a person skilled in the art. In addition to being used on self-propelled machines, wheel 10 may be used on any device configured to travel across terrain via assistance or propulsion from another machine.

As shown in FIGS. 1 and 2, exemplary wheel 10 includes a hub 12 configured to be coupled to a powertrain of a machine, and a tire 14 coupled to hub 12. Exemplary tire 14 is a molded, non-pneumatic tire. Exemplary tire 14 shown in FIGS. 1 and 2 includes an inner circumferential barrier 16 configured to be coupled to hub 12, and an outer circumferential barrier 18 configured to be coupled to, or provided with, a tread portion 20 configured to improve traction of the tire at the interface between tire 14 and the terrain across which tire 14 rolls. Extending between inner circumferential barrier 16 and outer circumferential barrier 18 is a support structure 22. Exemplary support structure 22 serves to couple inner circumferential barrier 16 and outer circumferential barrier 18 to one another. Hub 12 and/or inner circumferential barrier 16 may be configured to facilitate coupling of hub 12 to inner circumferential barrier 16.

According to some embodiments, support structure 22, inner circumferential barrier 16, and/or outer circumferential barrier 18 are integrally formed as a single, monolithic piece, for example, via molding. However, it is also contemplated that support structure 22, inner circumferential barrier 16, and/or outer circumferential barrier 18 may be formed separately and thereafter coupled to one another via adhesives and/or mechanical methods (e.g., via fasteners and/or complementary portions on adjacent parts.)

Tire 14, including inner circumferential barrier 16, outer circumferential barrier 18, tread portion 20, and support structure 22, may be configured to provide a desired amount of traction and cushioning between a machine and the terrain. For example, support structure 22 may be configured to support the machine in a loaded, partially loaded, and empty condition, such that a desired amount of traction and/or cushioning is provided, regardless of the load.

For example, if the machine is a wheel loader, when its bucket is empty, the load on one or more of wheels 10 may range from about 60,000 lbs. to about 160,000 lbs. (e.g., 120,000 lbs.). In contrast, with the bucket loaded with material, the load on one or more of wheels 10 may range from about 200,000 lbs. to about 400,000 lbs. (e.g., 350,000 lbs.). Tire 14 may be configured to provide a desired level of traction and cushioning, regardless of whether the bucket is loaded, partially loaded, or empty. For smaller machines, correspondingly lower loads are contemplated. For example, for a skid-steer loader, the load on one or more of wheels 10 may range from about 1,000 lbs. empty to about 3,000 lbs. (e.g., 2,400 lbs.) loaded.

Tire 14 may have dimensions tailored to the desired performance characteristics based on the expected use of the tire. For example, exemplary tire 14 may have a width W at tread portion 20 ranging from 0.1 meter to 2 meters (e.g., 1 meter), an inner diameter ID for coupling with hub 12 ranging from 0.5 meter to 4 meters (e.g., 2 meters), and an outer diameter OD ranging from 0.75 meter to 6 meters (e.g., 4 meters). According to some embodiments, the ratio of the inner diameter of tire 14 to the outer diameter of tire 14 ranges from 0.25:1 to 0.75:1, or 0.4:1 to 0.6:1, for example, about 0.5:1. Support structure 22 may have an inner axial width W, at inner circumferential barrier 16 ranging from 0.05 meter to 3 meters (e.g., 0.8 meter), and an outer axial width $W_o$ at outer circumferential barrier 18 ranging from 0.1 meter to 2 meters (e.g., 1 meter). For example, exemplary tire 14 may have an trapezoidal cross-section (see FIG. 2). Other dimensions are contemplated. For example, for smaller machines, correspondingly smaller dimensions are contemplated.

Support structure 22 of exemplary tire 14 shown in FIGS. 1 and 2 includes a plurality of first ribs 24 extending in a first circumferential direction between inner circumferential barrier 16 and outer circumferential barrier 18. For example, at least some of first ribs 24 are coupled to inner circumferential barrier 16 and outer circumferential barrier 18 and extend therebetween. Exemplary support structure 22 includes a plurality of second ribs 26 extending in a second circumferential direction opposite the first circumferential direction between inner circumferential barrier 16 and outer circumferential barrier 18. For example, in some embodiments, at least some of second ribs 26 are coupled to inner circumferential barrier 16 and outer circumferential barrier 18 and extend therebetween. According to some embodiments, at least some of first ribs 24 and some of second ribs 26 intersect one another such that they share common material at points of intersection. For example, at least one of first ribs 24 intersects at least two of second ribs 26, for example, at least four of second ribs 26.

In the exemplary embodiment shown in FIGS. 1 and 2, each of first ribs 24 has a cross-section perpendicular to the axial direction having a first curvilinear shape. The first curvilinear shape may be a curve having a single direction of curvature as shown in FIG. 1, or a curve having a direction of curvature that changes once as first ribs 24 extend between inner circumferential barrier 16 and outer circumferential barrier 18. Similarly, each of second ribs 26 may have a cross-section perpendicular the axial direction of tire 10 having a second curvilinear shape. The second curvilinear shape may be a curve having a single direction of curvature as shown in FIG. 1, or a curve having a direction of curvature that changes once as second ribs 26 extend between inner circumferential barrier 16 and outer circumferential barrier 18. According to some embodiments, center lines of respective first ribs 24 and/or second ribs 26 may define sweeping curves that do not include discontinuities in the respective sweeping curves.

Exemplary support structure 22 shown in FIGS. 1 and 2 defines a first axial side 28 and a second axial side 30 of tire 14. According to some embodiments, first ribs 24 and second ribs 26 define a plurality of cavities 32 extending between first axial side 28 and second axial side 30. According to some embodiments, at least some of cavities 32 may each extend in a substantially uninterrupted manner from first axial side 28 to second axial side 30, for example, as shown in FIG. 2. For some embodiments, at least some of cavities 32 may each define a cross-section perpendicular to the axis X that remains substantially uniform in area and/or shape as each of cavities 32 extends from first axial side 28 to second axial side 30. According to some embodiments, at least some of cavities 32 may each be partially or fully interrupted at a point between first axial side 28 and second axial side 30.

As shown in FIG. 2, for example, some embodiments include cavities 32 that have a cross-section that varies between first axial side 28 and second axial side 30 of tire 14. For example, at least some of cavities 32 include a first portion 34 defining an axial cross-section having an area that decreases as first portion 34 extends from first axial side 28 toward an intermediate region 36 of cavities 32 (e.g., axially equidistant between first axial side 28 and second axial side 30). At least some of cavities 32 may also include a second portion 38 that defines an axial cross-section having an area that decreases as second portion 38 extends from second axial side 30 toward intermediate region 36. For example, as shown in FIG. 2, first and second portions 34 and 38 may be tapered such the their respective cross-sectional areas decrease as they extend from respective first axial side 28 of tire 14 and second axial side 30 of tire 14 toward intermediate region 36. According to some embodiments, the cross-sectional shape of first and second portions 34 and 38 may also change. According to some embodiments, support structure 22 of tire 14 may be formed via a mold including two opposing mold halves, with each of the two mold halves having tapered projections configured to extend toward one another and provide tapered first and second portions.

According to some embodiments, tire 14 may be formed from an elastically deformable material, such as, for example, polyurethane, natural rubber, and/or synthetic rubber. For example, one or more of inner circumferential barrier 16, outer circumferential barrier 18, tread portion 20, and support structure 22 may be formed from polyurethane, natural and/or synthetic rubber, or combinations thereof. According to some embodiments, different parts of tire 14 may be formed from different materials. For example, support structure 22 may be formed from a first material, and tread portion 20 may be formed from a second material. For such embodiments, support structure 22 and/or other parts of tire 14 may be formed separately from tread portion 20, and tread portion 20 may be coupled or joined to outer circumferential barrier 18 via known methods, such as, for example, mechanical fastening and/or adhesives. According to some embodiments, inner circumferential barrier 16, support structure 22, outer circumferential barrier 18, and tread portion 20 may be formed together as a single piece, for example, via molding. According to some embodiments, inner circumferential barrier 16, support structure 22, outer circumferential barrier 18, and tread portion 20 may be formed together as a single piece, and support structure 22 and/or outer circumferential barrier 18 may be formed from a first material, and tread portion 20 may be formed from a second material different from the first material, such that tread portion 20 exhibits different characteristics than support structure 22 and/or outer circumferential barrier 18. For example, the second material forming tread portion 20 may provide tread portion 20 with more wear resistance, abrasion resistance, hardness, toughness, and/or a different appearance (e.g., color or texture) than the first material forming inner circumferential barrier 16, support structure 22, and/or outer circumferential barrier 18. According to some embodiments, the first material may include at least one polymer selected from the group consisting of polyurethane, natural rubber, synthetic rubber, and combinations thereof. According to some embodiments, the second material may include at least one polymer selected from the group consisting of polyurethane, natural rubber, synthetic rubber, and combinations thereof.

Figure 3:
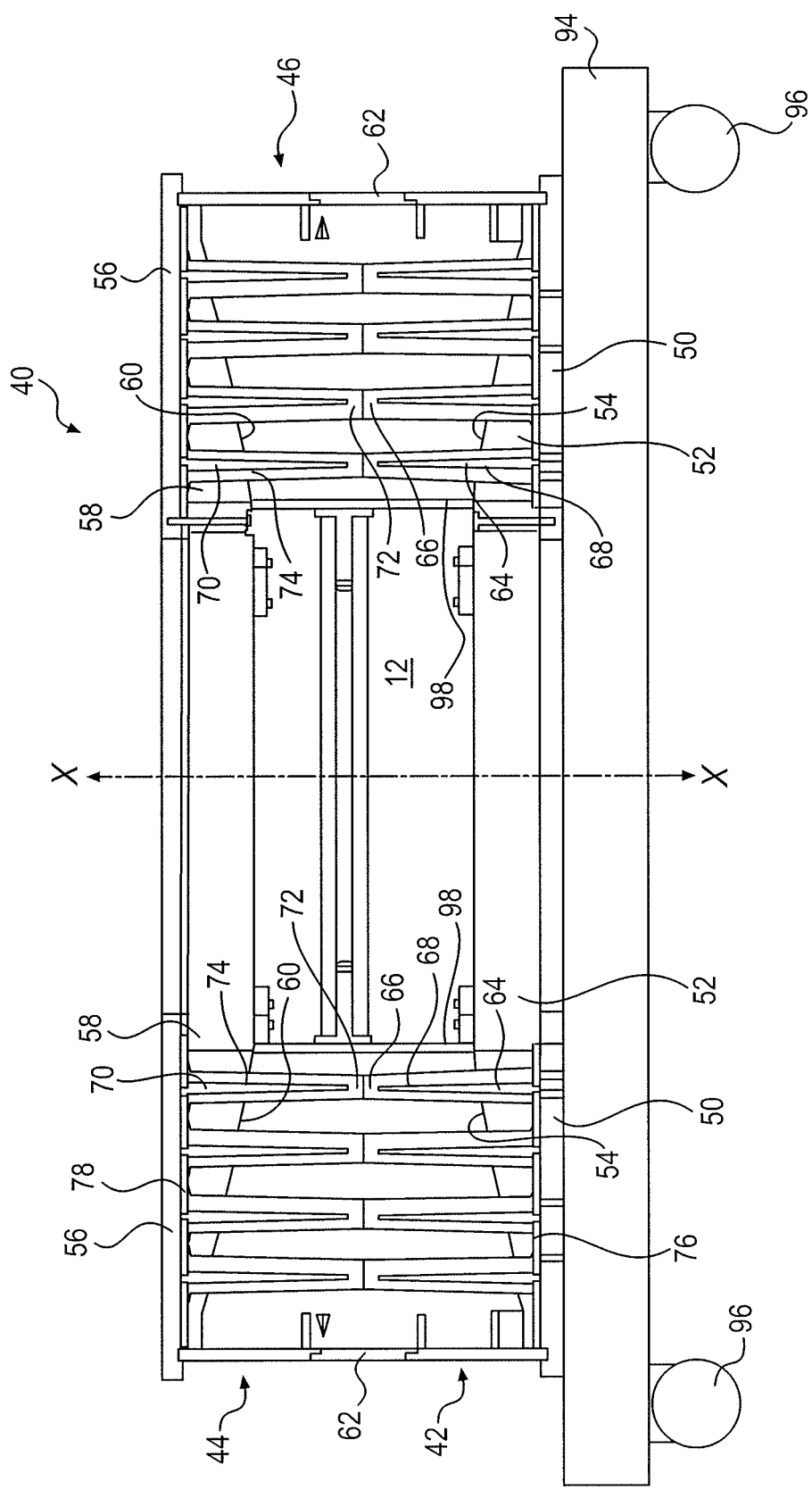
FIG. 3 is a cross-sectional side view of an exemplary embodiment of a system for molding a non-pneumatic tire.
Figure 4:
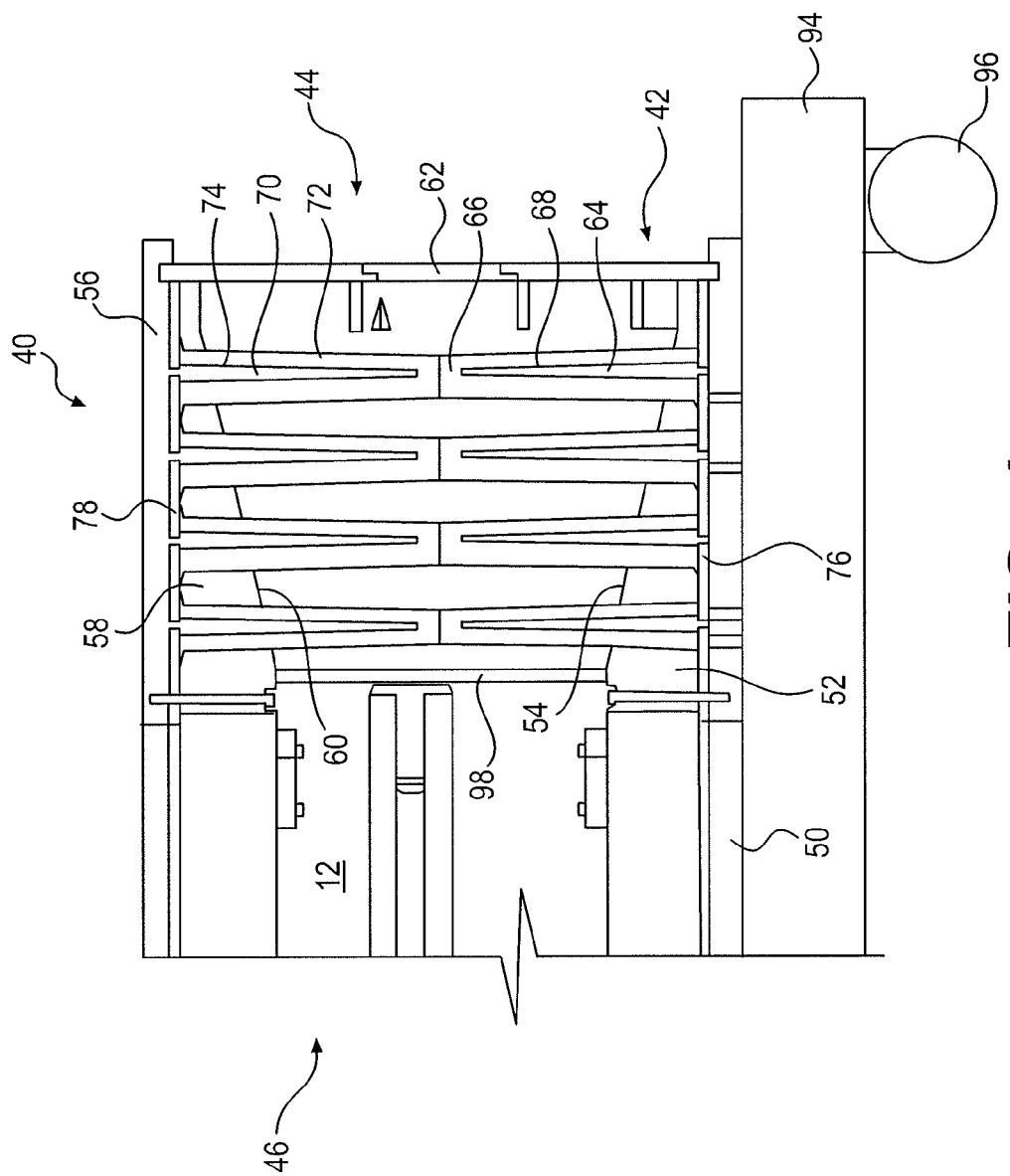
FIG. 4 is a detailed view of a portion of the exemplary system shown in FIG. 3.

FIGS. 3 and 4 show an exemplary embodiment of a system 40 for molding non-pneumatic tires, for example, exemplary tire 14 shown in FIGS. 1 and 2. In the exemplary embodiment shown in FIGS. 3 and 4, system 40 includes a lower mold portion 42 and an upper mold portion 44 mounted on lower mold portion 42, such that hub 12 associated with molded tire 14 is received between lower mold portion 42 and upper mold portion 44. Except as noted herein, according to some embodiments, lower mold portion 42 and upper mold portion 44 may be formed primarily from metallic materials, such as, for example, steel, stainless steel, and aluminum, which may provide good heat transfer to and from the molding material during curing and cooling. In the exemplary embodiment shown FIGS. 3 and 4, the combination of lower mold portion 42, upper mold portion 44, and hub 12 form a mold assembly 46 defining a sealed interior configured to receive a molding material. According to some embodiments, upon receipt of the molding material, hub 12 is molded into tire 14.

As shown in FIGS. 3 and 4, exemplary lower mold portion 42 includes a lower backing plate 50. According to some embodiments, lower backing plate 50 may be formed by one or more sections forming an annular lower surface of mold assembly 46 (see, e.g., FIG. 9). Exemplary mold assembly 46 also includes a lower retention plate 52 coupled to lower backing plate 50. Lower retention plate 52 may be configured to provide a lower relief 54 corresponding to a side of tire 14 being molded (e.g., first axial side 28). Similarly, exemplary upper mold portion 44 includes an upper backing plate 56. According to some embodiments, upper backing plate 56 may be formed by one or more sections forming an annular upper surface of mold assembly 46 (see, e.g., FIG. 13). Exemplary mold assembly 46 also includes an upper retention plate 58 coupled to upper backing plate 56. Upper retention plate 58 may be configured to provide an upper relief 60 corresponding to a second side of tire 14 being molded (e.g., second axial side 30). Lower backing plate 50, lower retention plate 52, upper backing plate 56, and/or upper retention plate 58 may be formed from a material having a high thermal conductivity, such as, for example, aluminum, which will facilitate heating and cooling of the molding material in the interior of mold assembly 46.

As shown in FIGS. 3 and 4, lower relief 54 and upper relief 60 may be configured such that the cross-section of tire 14 molded in mold assembly 46 increases with the radius of the tire. For example, the cross-section of tire 14 may be wider adjacent tread portion 20 than adjacent hub 12. For example, as shown in FIG. 2, the cross-section may have a substantially trapezoidal shape (i.e., FIG. 2 shows that half the cross-section has a trapezoidal shape). It is contemplated that the cross-section has other shapes, such as, for example, concave, convex, and parallelogram shapes.

As shown in FIGS. 3 and 4, exemplary mold assembly 46 includes a circular barrier 62 coupled to lower backing plate 50 and upper backing plate 56. Exemplary circular barrier 62 is substantially perpendicular to lower backing plate 50 and corresponds to a portion of an outer circumferential surface of tire 14 during molding.

In the exemplary embodiment shown in FIGS. 3 and 4, lower mold portion 42 also includes a plurality of lower projections 64 that are coupled to and extend from lower backing plate 50 toward upper mold portion 44. According to some embodiments, lower projections 64 taper as they extend from lower backing plate 50. According to some embodiments, lower projections 64 are tapered rods, which may be formed from, for example, a metallic material such as steel or aluminum. Lower projections 64 may be coupled to lower backing plate 50 via mechanical fasteners and/or adhesives. According to some embodiments, lower projections 64 may be coupled to lower backing plate 50 either directly or via lower retention plate 52.

In the exemplary embodiment shown in FIGS. 3 and 4, lower mold portion 42 also includes a plurality of lower sleeves 66, each at least partially covering (e.g., fully covering) a corresponding one of lower projections 64. Exemplary lower sleeves 66 have an internal recess 68 having an internal surface shaped substantially similar to an external surface of lower projections 64. In the exemplary embodiment shown, the external surfaces of lower projections 64 are tapered, and internal recesses 68 of lower sleeves 66 are also tapered. According to some embodiments, internal recesses 68 and lower projections 64 are tapered to a greater extent than the external surfaces of lower sleeves 66 (i.e., the sides of the external surfaces of lower sleeves 66 are closer to being parallel to one another). According to some embodiments, external surfaces of lower sleeves 66 are tapered as they extend from lower backing plate 50. As a result, cavities 32 formed in tire 14 are tapered, for example, as shown in FIG. 2, such that they have a smaller cross-section at axially intermediate region 36 than at the outer sides of tire 14. This may facilitate removing tire 14 from mold assembly 46 following molding and/or may provide desired performance characteristics of the tire. As shown in FIGS. 3 and 4, some embodiments of lower mold portion 42 are configured to receive hub 12. In the exemplary embodiment shown, lower projections 64 and lower sleeves 66 are arranged around hub 12 in a number of concentric circles.

As shown in FIGS. 3 and 4, upper mold portion 44 also includes a plurality of upper projections 70 that are coupled to and extend from upper backing plate 56 toward lower mold portion 42. According to some embodiments, upper projections 70 taper as they extend from upper backing plate 56. According to some embodiments, upper projections 70 are tapered rods, which may be formed from, for example, a metallic material such as steel or aluminum. Upper projections 70 may be coupled to upper backing plate 56 via mechanical fasteners and/or adhesives. According to some embodiments, upper projections 70 may be coupled to upper backing plate 56 either directly or via upper retention plate 58.

As shown in FIGS. 3 and 4, exemplary upper mold portion 44 also includes a plurality of upper sleeves 72, each at least partially covering (e.g., fully covering) a corresponding one of upper projections 70. Exemplary upper sleeves 72 have an internal recess 74 having an internal surface shaped substantially similar to an external surface of upper projections 70. In the exemplary embodiment shown, the external surfaces of upper projections 70 are tapered, and internal recesses 74 of upper sleeves 72 are also tapered. According to some embodiments, internal recesses 74 and upper projections 70 are tapered to a greater extent than the external surfaces of upper sleeves 72 (i.e., the sides of the external surfaces of upper sleeves 72 are closer to being parallel to one another). According to some embodiments, external surfaces of upper sleeves 72 are tapered as they extend from upper backing plate 56. As a result, cavities 32 formed in tire 14 are tapered, for example, as shown in FIG. 2, such that they have a smaller cross-section at axially intermediate region 36 than at the outer sides of tire 14. This may facilitate removing tire 14 from mold assembly 46 following molding and/or may provide desired performance characteristics of tire 14. As shown in FIGS. 3 and 4, some embodiments of upper mold portion 44 are configured to receive hub 12. In the exemplary embodiment shown, upper projections 70 and upper sleeves 72 are arranged around hub 12 in a number of concentric circles.

According to some embodiments, lower sleeves 66 and/or upper sleeves 72 may be formed from a heat-resistant material that is relatively easy to separate from the molding material of tire 14 following curing of the molding material. For example, the material forming sleeves 66 and/or 72 may be capable of being heated above the curing temperature of a urethane and/or rubber molding material during curing of the molding material so that sleeves 66 and/or 72 generally maintain their desired shape so that, for example, cavities 32 in tire 14 have the desired shape. In addition, the material forming sleeves 66 and/or 72 may be capable of being easily separated from a cured urethane and/or rubber molding material to facilitate separation of upper mold portion 44 from lower mold portion 42 and molded tire 14, and to facilitate separation of molded tire 14 from lower mold portion 42. For example, lower and/or upper sleeves 66 and 72 may be formed from a material including silicone or similar materials.

According to some embodiments, lower sleeves 66 and/or upper sleeves 72 include a silicone containing material (e.g., silicone), which may easily separate from molded urethane of tire 14. For example, when upper mold portion 44 is separated from lower mold portion 42 and molded tire 14, upper sleeves 72 may initially adhere to the molded urethane and thereafter slightly stretch as upper mold portion 44 is pulled away from molded tire 14. After an initial stretching of the silicone, which causes a reduction in the cross-section of upper sleeves 72, the strength of the silicone overcomes the adherence of the silicone to the molded urethane and releases from molded tire 14, thereby permitting upper mold portion 44 to be separated completely from molded tire 14 and lower mold portion 42. Similarly, when molded tire 14 is separated from lower mold portion 42, lower sleeves 66 may initially adhere to the molded urethane and thereafter slightly stretch as molded tire 14 is pulled away from lower mold portion 42. After an initial stretching and a corresponding reduction in cross-section, the strength of the silicone overcomes the adherence of the silicone to the molded urethane and releases from molded tire 14, thereby permitting molded tire 14 to be separated completely from lower mold portion 42.

According to some embodiments, the opposing ends of corresponding lower sleeves 66 and upper sleeves 72 contact one another, so that cavities 32 formed in tire 14 extend from first axial side 28 of tire 14 to second axial side 30 of tire 14 in a substantially uninterrupted manner upon removal of tire 14 from mold assembly 46, for example, as shown in FIG. 2. According to the exemplary embodiment of mold assembly 46 shown in FIGS. 3 and 4, cavities 32 will have a substantially greater axial length than cross-sectional size. In addition, in the exemplary embodiment shown, the amount of taper of cavities 32 is relatively slight, resulting in a relatively small draft angle.

Figure 5:
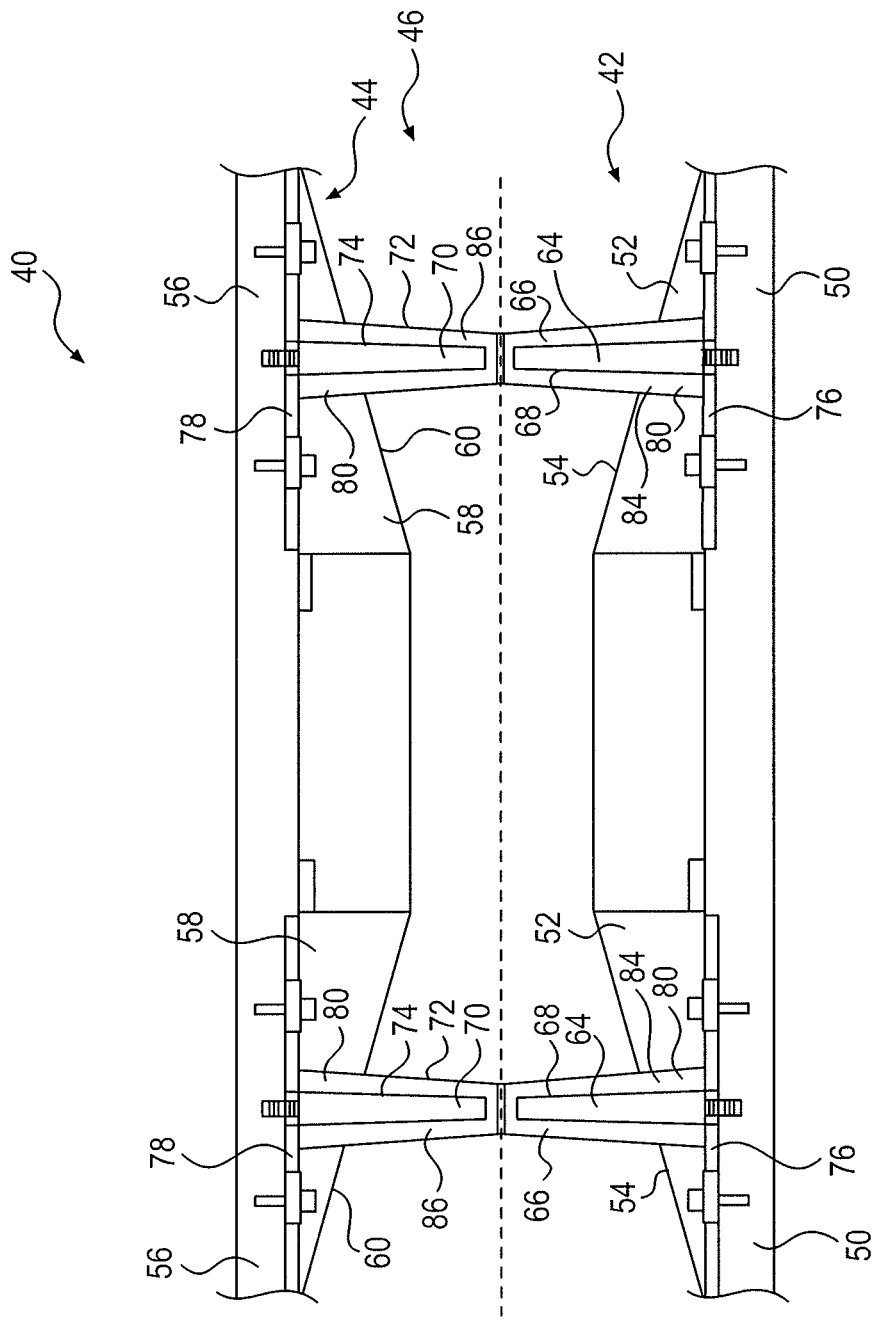
FIG. 5 is side section view of portions of an exemplary embodiment of a system for molding a non-pneumatic tire.

As shown in FIGS. 3-5, exemplary lower sleeves 66 and upper sleeves 72 include respective lower and upper flange portions 76 and 78 at respective lower and upper base ends 80 and 82 of lower and upper sleeves 66 and 72. As shown in FIG. 5, upper and lower flange portions 76 and 78 of respective lower and upper sleeves 66 and 72 facilitate coupling of lower and upper sleeves 66 and 72 to respective lower and upper backing plates 50 and 56.

Figure 6:
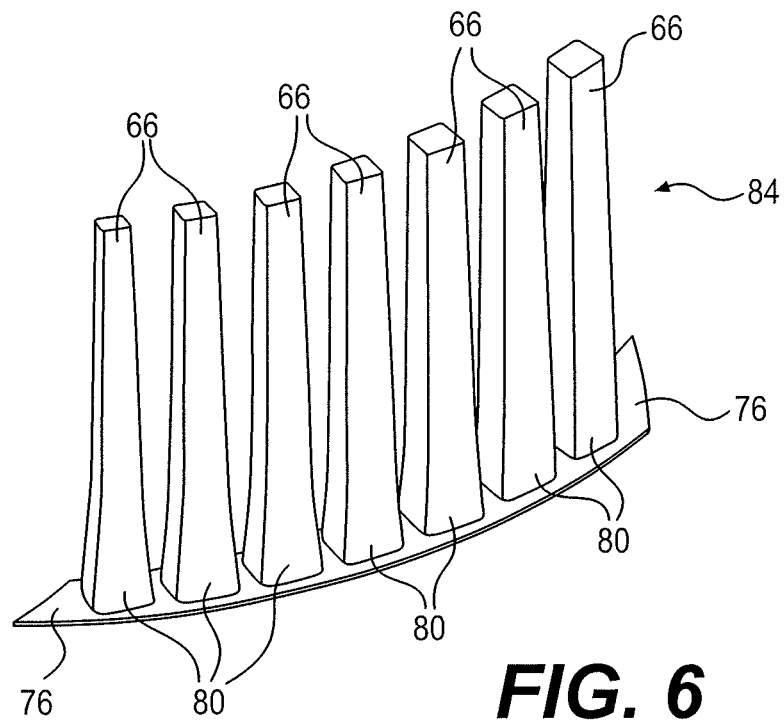
FIG. 6 is a perspective view of a portion of an exemplary embodiment of a molding assembly.

According to some embodiments, lower and/or upper sleeves 66 and 72 may be formed as groups of sleeves configured to be placed over a plurality of projections, for example, as shown in FIG. 6. As shown, a plurality of sleeves (either lower or upper) are grouped together in a sleeve segment 84. For example, exemplary lower sleeve segment 84 includes a lower flange portion 76 at a lower base end 80 coupling together a plurality of lower sleeves 66. Similarly, according to some embodiments, mold assembly 46 may include upper sleeve segments 86 including an upper flange portion 78 at an upper base end 82 at least similar to lower sleeve segment. In the exemplary embodiment shown in FIG. 6, sleeve segment 84 is arc-shaped, such that cavities 32 formed the sides of tire 14 are formed in arc-shaped patterns, for example, as shown in FIG. 1. Exemplary sleeve segment 84 shown in FIG. 6 has seven lower sleeves 66. Sleeve segments having other shapes and numbers of sleeves are contemplated.

According to some embodiments, lower and upper sleeves 66 and 72 may be coupled to respective lower and upper backing plates 50 and 56 via respective lower and upper retention plates 52 and 58. For example, as shown in FIGS. 3-5, lower retention plate 52 is configured to couple lower flange portion 76 of lower sleeves 66 to lower backing plate 50 by trapping lower flange portion 76 between lower retention plate 52 and lower backing plate 50. Similarly, upper retention plate 58 is configured to couple upper flange portion 78 of upper sleeves 72 to upper backing plate 56 by trapping upper flange portion 78 between upper retention plate 58 and upper backing plate 56. Lower and upper retention plates 52 and 58 may be coupled to respective lower and upper backing plates 50 and 56 via mechanical fasteners and/or adhesives.

By coupling lower sleeves 66 and upper sleeves 72 respectively to lower mold portion 42 and upper mold portion 44 via respective lower and upper retention plates 52 and 58 in the exemplary manner described, lower and upper sleeves 66 and 72 may be serviced. For example, if any of lower and upper sleeves 66 and 72 are damaged or worn, any such sleeves may be removed from mold assembly 46 by removing a corresponding retention plate. Thereafter, the damaged or worn sleeve may be repaired or replaced. This may increase the service life of mold assembly 46.

Figure 7:
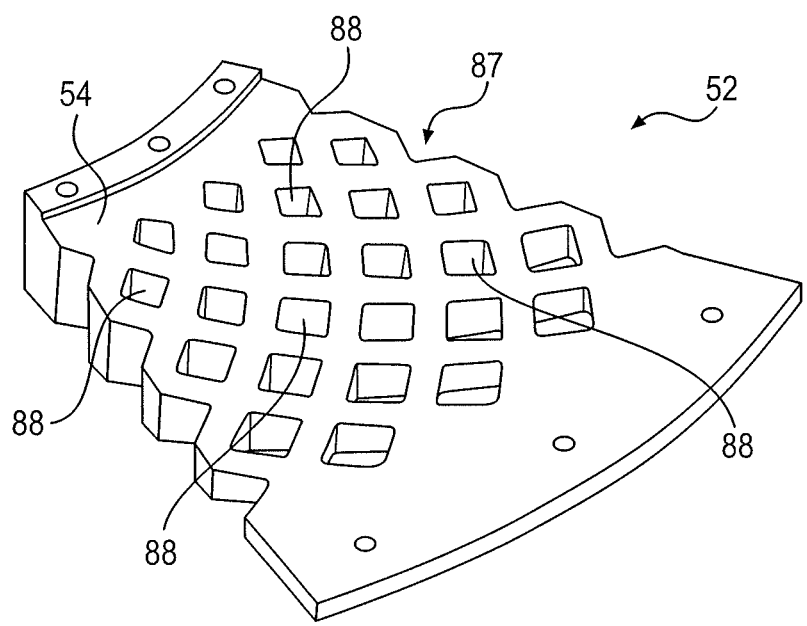
FIG. 7 is a perspective view of a portion of an exemplary embodiment of a molding assembly.
Figure 8:
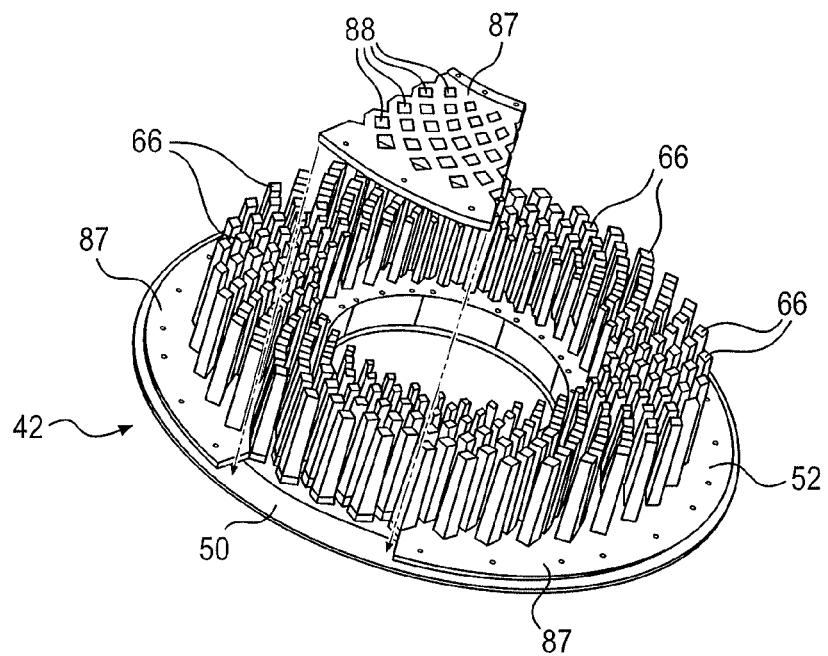
FIG. 8 is a perspective view of a portion of an exemplary embodiment of a molding assembly.

According to some embodiments, lower and upper retention plates 52 and 58 may be formed from a plurality of respective lower and upper retention plate sectors. For example, as shown in FIGS. 7 and 8, lower retention plate 52 includes a plurality of lower retention plate sectors 87 forming lower retention plate 52. In the exemplary embodiment shown, lower retention plate sectors 87 include a plurality of apertures 88 configured to receive therethrough lower projections 64 and lower sleeves 66. In the exemplary embodiments shown, lower projections 64 are coupled directly to lower backing plate 50, lower sleeves 66 fit over top of respective lower projections 64, and lower retention plate 52 fits down over lower projections 64 and lower sleeves 66, with lower projections 64 and lower sleeves 66 extending though apertures 88. Similarly, upper retention plate 58 may be formed from a plurality of upper retention plate sectors including apertures for receiving upper projections 70 and upper sleeves 72.

Figure 9:
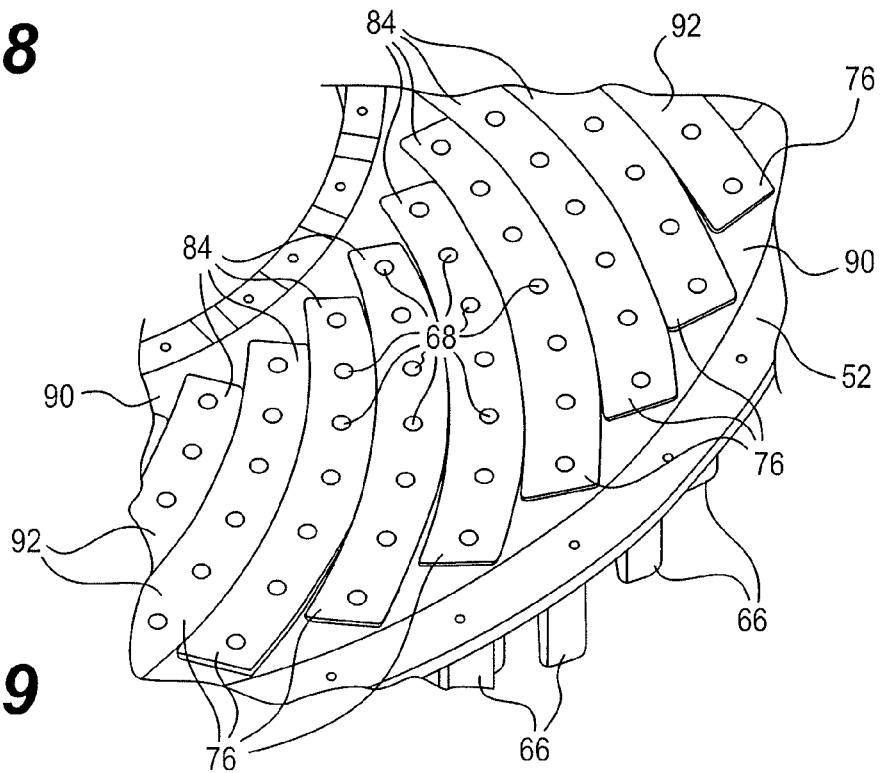
FIG. 9 is a partial perspective view of a portion of an exemplary embodiment of a molding assembly.

According to some embodiments, lower and upper retention plates 52 and 58 may be configured to receive the flange portions of sleeve segments. For example, FIG. 9 shows the underside 90 of lower retention plate 52. As shown, lower sleeves 66 project through apertures 88 in lower retention plate sectors 87, such that lower flange portions 76 of lower sleeve segments 84 are substantially flush with underside 90 of lower retention plate 52. According to some embodiments, underside 90 of lower retention plate 52 may include shallow recesses (not shown) configured to receive lower flange portions 76, such that the undersides 92 of lower flange portions 76 are substantially flush with underside 90 of lower retention plate 52. Upper retention plate 58 may be formed similarly. As shown in FIG. 9, lower sleeve segments 84 include internal recesses 68 for receiving lower projections 64.

Figure 10:
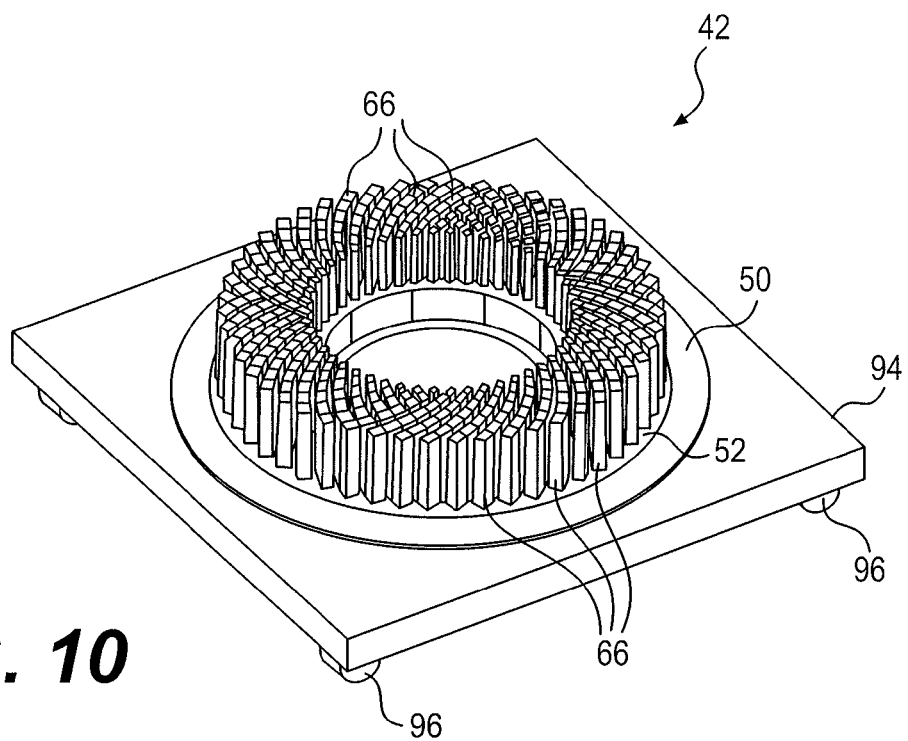
FIG. 10 is a perspective view of portions of an exemplary embodiment of a molding assembly in a first condition.

FIGS. 10-17 show exemplary processes for assembling exemplary molding system 40 and pouring a molding material into mold assembly 46 to form a molded tire. As shown in FIG. 10, lower mold portion 42 may be placed on a platform 94. Platform 94 may include rollers 96 (e.g., wheels) configured to facilitate movement of mold assembly 46 during use, for example, in order to move mold assembly 46 into and out of an oven for curing the molding material. As shown in FIG. 10, lower mold portion 42 includes lower backing plate 50 and a plurality of lower projections 64 covered by corresponding lower sleeves 66, with lower sleeves 66 coupled to lower backing plate 50 via lower retention plate 52, for example, as shown in FIG. 8.

Figure 11:
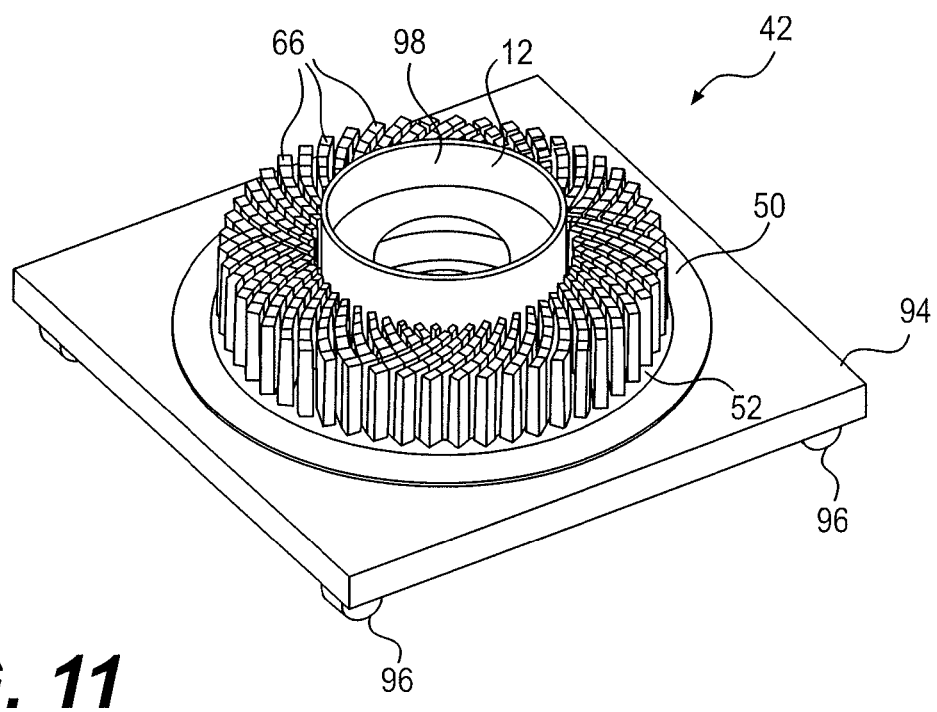
FIG. 11 is a perspective view of portions of the exemplary molding assembly shown in FIG. 10 in another condition.
Figure 12:
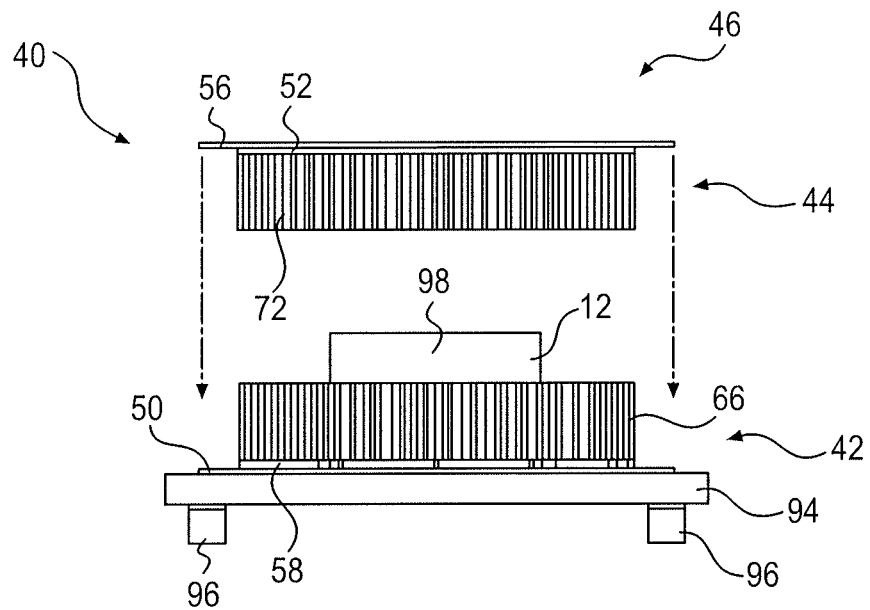
FIG. 12 is a side view schematically showing portions of an exemplary molding assembly being assembled.
Figure 13:
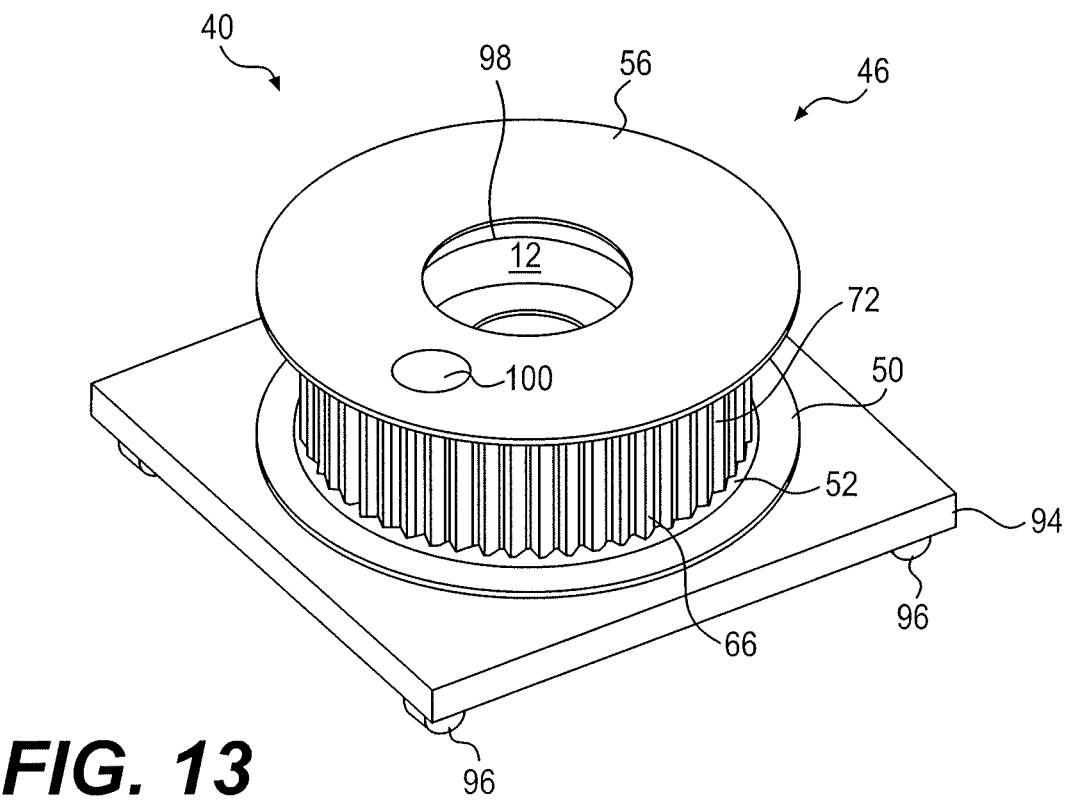
FIG. 13 is a perspective view of the portions shown in FIG. 12 coupled to one another.

As shown in FIG. 11, hub 12 of wheel 10 is placed in the center of lower mold portion 42 such that a flange 98 of hub 12 forms a seal with lower retention plate 52, as shown in FIGS. 3 and 4. Upper mold portion 44 may include a similar construction as lower mold portion 42, including an upper backing plate 56 and a plurality of upper projections 70 covered by corresponding upper sleeves 72, with upper sleeves 72 coupled to upper backing plate 56 via upper retention plate 56, for example, as shown in FIGS. 3 and 4. As shown in FIGS. 12 and 13, upper mold portion 44 is lowered down onto hub 12 and lower mold portion 42, such that a seal is formed between flange 98 of hub 12 and upper backing plate 56, as shown in FIGS. 3 and 4. According to some embodiments, lower and upper mold portions 42 and 44 may include structures such as guide pins and respective guide pin receivers to facilitate proper alignment and radial registration of upper mold portion 44 with respect to lower mold portion 42. This may help to ensure a proper seal between flange 98 of hub 12 and lower and upper backing plates 50 and 56, and to properly align the ends of lower and upper projections 64 and 70.

Figure 14:
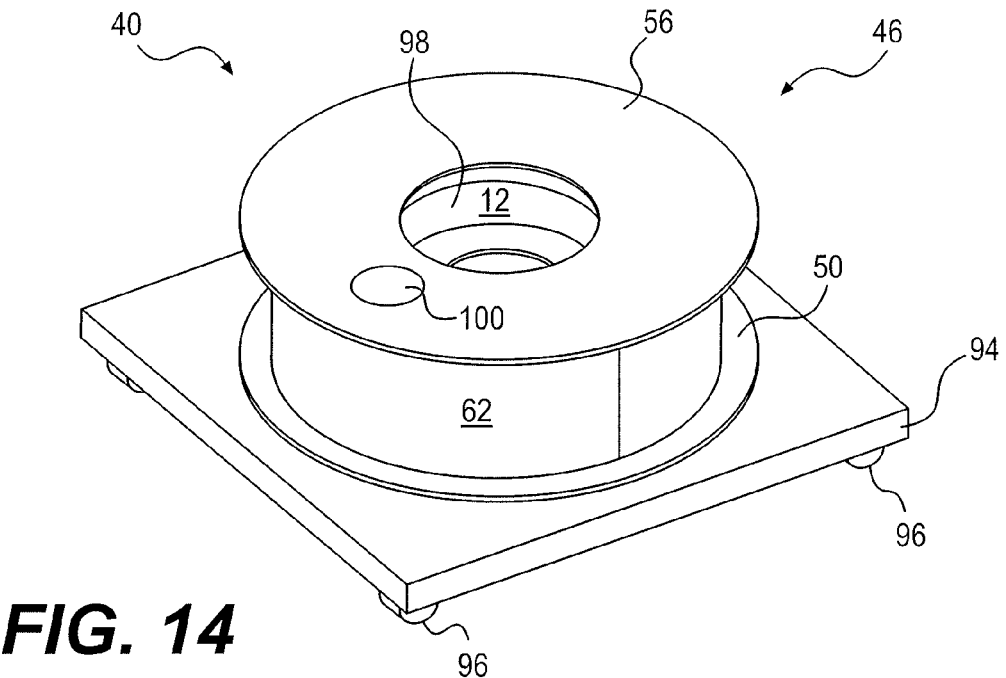
FIG. 14 is a perspective view of the exemplary mold assembly show in FIGS. 12 and 13 shown with an additional portion coupled thereto.
Figure 15:
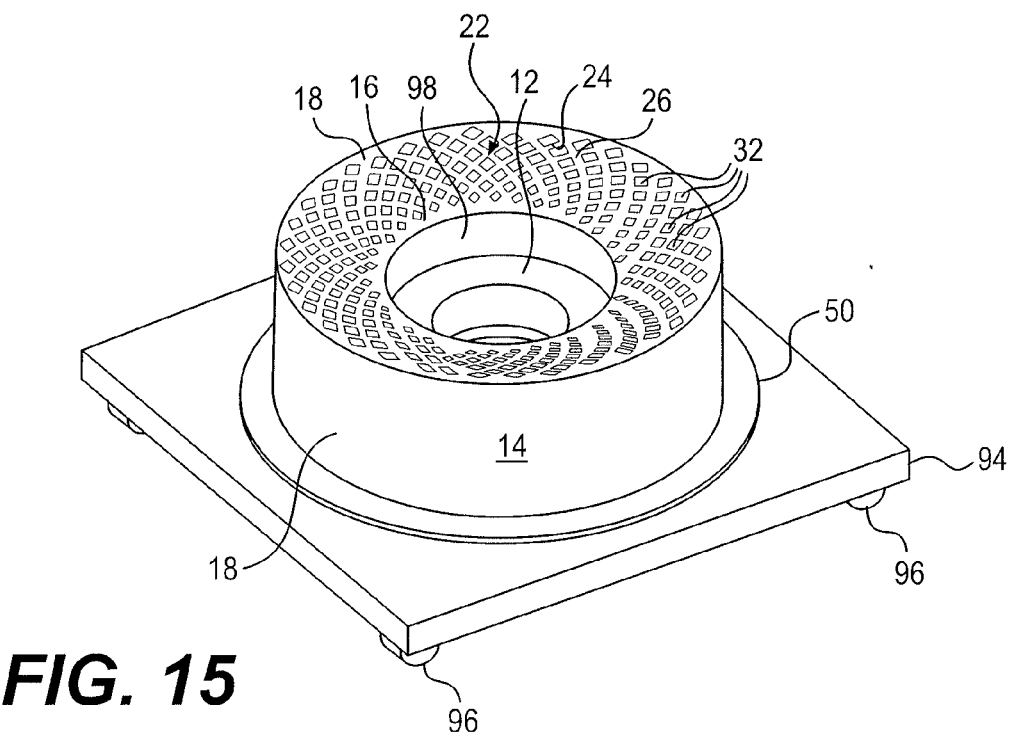
FIG. 15 is a perspective view of the exemplary molding assembly shown in FIGS. 12-14 following molding of an exemplary tire and removal of portions of the molding assembly.

As shown in FIG. 14, circular barrier 62 may be formed or placed around the periphery of mold assembly 46, such that lower and upper edges of circular barrier 62 form a seal with lower and upper backing plates 50 and 56, thereby enclosing mold assembly 46, as shown in FIGS. 3 and 4. According to some embodiments, circular barrier 62 may be positioned on lower backing plate 50 prior to lowering upper mold portion 44 onto lower mold portion 42.

As shown in FIG. 14, upper backing plate 56 may include one or more fill holes 100 through which the molding material may be added to the interior of mold assembly 46. Providing a plurality of fill holes 100 may facilitate adding the molding material more rapidly, which may result in more even distribution of the molding material throughout the interior of mold assembly 46. This may prevent uneven temperatures in the molding material or uneven cooling of the molding material as it is supplied to the interior of mold assembly 46. Although not shown, fill hole covers may be provided to prevent molding material from escaping mold assembly 46 during curing or heating of mold assembly 46 and molding material. Vent holes may also be provided to permit the escape of pressure and gases.

Once the molding material has been supplied to mold assembly 46, mold assembly 46 containing the molding material may be moved into an oven so that the molding material may be cured at a desired temperature for a desired duration. Thereafter, mold assembly 46 and the molding material may be cooled to a desired temperature, and upper mold portion 42 and circular barrier 62 may be separated from lower mold portion 42, thereby exposing molded tire 14.

According to some embodiments, circular barrier 62 may be provided with an inner relief for forming tread portion 20 during molding of the remainder of tire 14. According to some embodiments, circular barrier 62 may not be configured to form tread portion 20, and tread portion 20 may instead be molded separately from the remainder of tire 14. This may permit the use of a material having different properties to be used for tread portion 20. For example, the material forming tread portion 20 may provide tread portion 20 with more wear resistance, abrasion resistance, hardness, toughness, and/or a different appearance (e.g., color or texture) than the material forming the remainder of tire 14.

Figure 16:
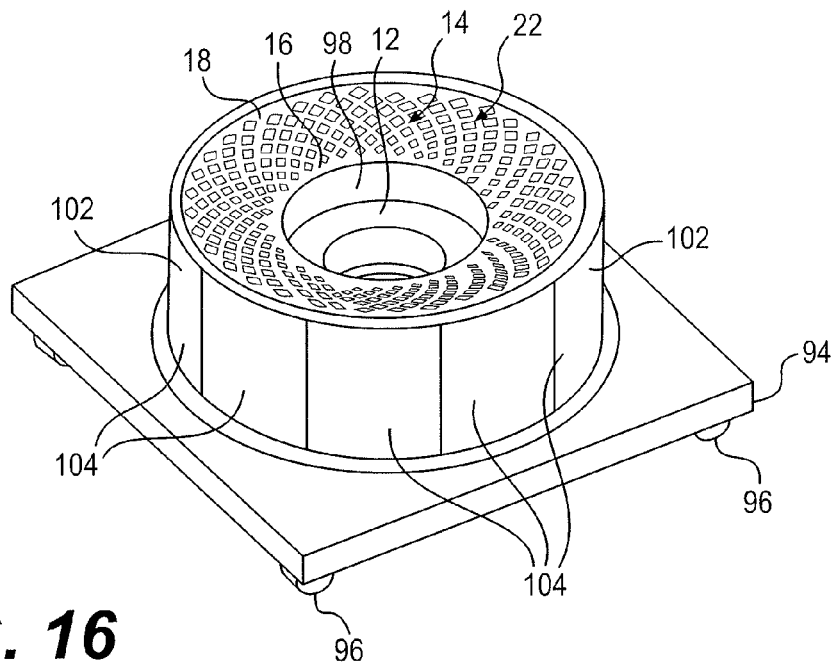
FIG. 16 is a perspective view of the exemplary molding assembly shown in FIGS. 10-15 with an additional portion of the molding assembly coupled thereto for forming a tread portion on the exemplary tire.
Figure 17:
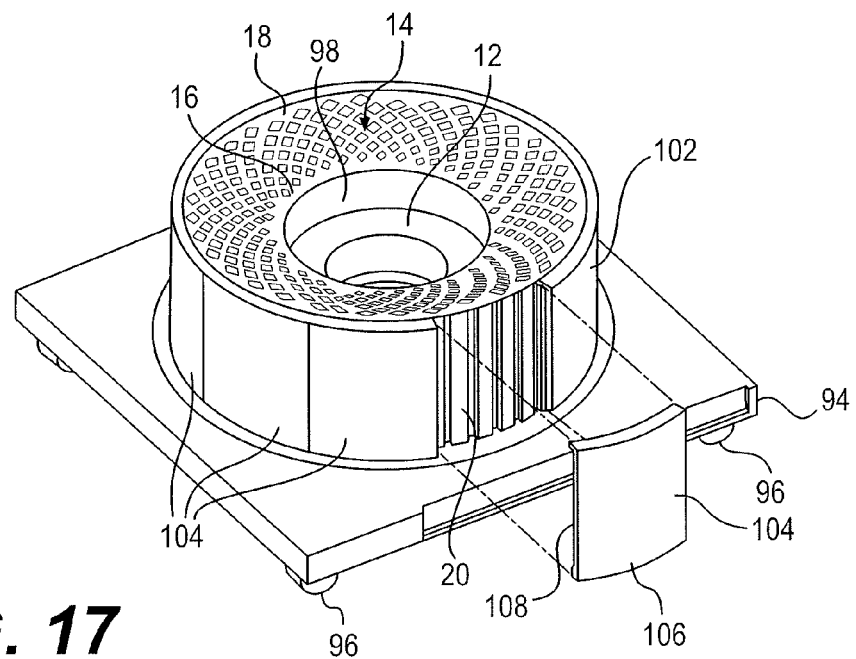
FIG. 17 is a perspective view of the exemplary molding assembly shown in FIG. 16 with a portion of the molding assembly removed.

For example, as shown in FIGS. 16 and 17, after upper mold portion 42 and circular barrier 62 have been removed from lower mold portion 42, a circular barrier 102 may be formed around molded tire 14. Circular barrier 102 may be configured to mold tread portion 20 onto outer circumferential barrier 18 of support structure 22 of tire 14. According to some embodiments, circular barrier 102 may include a plurality of curved barrier sections 104 coupled to one another in an end-to-end manner, for example, as shown in FIGS. 16 and 17. Exemplary barrier sections 104 include on outer shell portion 106 and a relief layer 108 configured to form a tread pattern on tread portion 20 of tire 14. According to some embodiments, relief layer 108 may be formed of a material the facilitates separation of barrier sections 104 from tread portion 20 following molding. For example, relief layer 108 may be formed from a heat-resistant material that is relatively easy to separate from the molding material of tread portion 20 following curing of the molding material. For example, the material relief portion 108 may be capable of being easily separated from a cured urethane and/or rubber molding material to facilitate separating circular barrier 102 from molded tread portion 20. For example, relief layer 108 may be formed from a material including silicone or similar materials.

After circular barrier 102 is assembled around molded tire 14, molding material for forming tread portion 20 may be supplied to a space between circular barrier 102 and outer circumferential barrier 18 of support structure 22 of tire 14. According to some embodiments, an upper backing plate (not shown) may be coupled to lower hub 12 and an upper edge of circular barrier 102 to form a sealed cavity for receiving the molding material for forming tread portion 20. Following supply and curing of the molding material, the upper backing plate (if any) and circular barrier 102 are separated from molded tire 14, which includes a tread portion 20. Thereafter, the molded tire can be separated from lower mold portion 42.

INDUSTRIAL APPLICABILITY

The systems and methods for molding parts disclosed herein may be used to mold non-pneumatic tires for the wheels of a machine configured to travel across terrain. For example, such wheels may be used on machines, such as, for example, an automobile, a truck, an agricultural vehicle, and/or a construction vehicle, such as, for example, a wheel loader, a dozer, a skid-steer loader, an excavator, a grader, an on-highway truck, an off-highway truck, and/or any other vehicle type known to a person skilled in the art. In addition to being used on self-propelled machines, the wheels may be used on any device configured to travel across terrain via assistance or propulsion from another machine.

According to some embodiments of the systems and methods, it may be possible to form relatively small or intricate features in the parts being molded, while facilitating separation of portions of the mold from the molded parts following curing of the molding material inside the mold. According to some embodiments, the systems and methods may be used to form features in the parts that extend relatively deeply into the molded parts, even if the molded part is particularly large. As a result, it may not be necessary to design the mold so that it has relatively large draft angles to facilitate removal of the molded parts from the mold following curing of the molding material. This may be facilitated by the combination of projections and sleeves in the mold portions, which may render it relatively easier to remove the molded parts from the mold portions.

According to some embodiments of the systems and methods, it may be possible to mold non-pneumatic tires that have a desired level of compressibility by forming axially-extending cavities in the tires between the tread portion and the hub, while rendering it relatively easier to separate the mold assembly from the tires, even though there is an increased surface area of contact between the mold and the molded tires. According to some embodiments, the systems and methods disclosed herein may allow formation of a relatively large number of cavities having a relatively small cross-section compared to the length of the cavities. In addition, because the sleeves according to some embodiments may be removed from the mold portions, it is possible to repair or replace the sleeves if damaged or worn from repeated molding cycles. Furthermore, the projections and sleeves are coupled to the lower and upper mold portions, and are not inserted and removed from the mold assembly during each molding operation. As a result, it is not necessary to manually insert and remove them from the mold assembly each time a molded tire is being formed. This may result in more efficient formation of the molded tires and fewer improperly formed features resulting from improperly inserted mold portions.

It will be apparent to those skilled in the art that various modifications and variations can be made to the exemplary systems and methods. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A system for molding a non-pneumatic tire, the system comprising:
    a lower mold portion including:
        a lower backing plate;
        a plurality of lower projections extending from the lower backing plate, wherein the lower projections are arranged in a first predetermined pattern to correspond to a pattern of cavities in a first side of the tire;
        a plurality of lower sleeves configured to at least partially cover the lower projections, the lower sleeves having an external surface and an internal recess having an internal surface, wherein the internal surface of the lower sleeves is shaped substantially similar to an external surface of the lower projections, and the external surface of the lower sleeves corresponds substantially to an external surface of the cavities in the first side of the tire; and
        at least one lower retention plate configured to be positioned proximate the lower backing plate and retain the lower sleeves on the lower projections; and
    an upper mold portion configured to be associated with the lower mold portion, the upper mold portion including:
        an upper backing plate;
        a plurality of upper projections extending from the upper backing plate, wherein the upper projections are arranged in a second predetermined pattern to correspond to a pattern of cavities in a second side of the tire;
        a plurality of upper sleeves configured to at least partially cover the upper projections, the upper sleeves having an external surface and an internal recess having an internal surface, wherein the internal surface of the upper sleeves is shaped substantially similar to an external surface of the upper projections, and the external surface of the upper sleeves corresponds substantially to an external surface of the cavities in the second side of the tire; and
        at least one upper retention plate configured to be positioned proximate the upper backing plate and retain the upper sleeves on the upper projections.

2. The system of claim 1, wherein the tire includes urethane, and at least some of the lower and upper sleeves are configured to separate from the urethane following formation of the tire.

3. The system of claim 2, wherein the at least some lower and upper sleeves include silicone material.

4. The system of claim 1, wherein at least some of the lower and upper projections are tapered.

5. The system of claim 1, wherein at least some of the lower and upper sleeves are tapered.

6. The system of claim 1, wherein the at least one lower retention plate is configured to provide a lower relief corresponding to the first side of the tire, and the at least one upper retention plate is configured to provide an upper relief corresponding to the second side of the tire.

7. The system of claim 1, wherein the lower and upper mold portions are configured to be associated with one another such that a hub associated with the tire provides a seal between the lower and the upper mold portions.

8. The system of claim 1, further including a circular barrier coupled to the lower and upper mold portions, wherein the circular barrier is configured to provide a seal between the lower and upper mold portions.

9. The system of claim 8, wherein the circular barrier is configured to provide a relief corresponding to a tread portion of the tire.

10. The system of claim 9, wherein the circular barrier includes a plurality of curved barrier sections coupled to one another to form the circular barrier.

11. The system of claim 1, wherein the at least one lower retention plate includes a plurality of lower retention plate sectors coupled to the lower backing plate, and the at least one upper retention plate includes a plurality of upper retention plate sectors coupled to the upper backing plate.

12. The system of claim 1, wherein the plurality of lower sleeves includes a plurality of lower sleeve segments, and wherein the plurality of upper sleeves includes a plurality of upper sleeve segments, wherein each of the lower and upper sleeve segments includes a plurality of respective lower and upper sleeves, each configured to at least partially cover one of the respective lower and upper projections.

13. The system of claim 12, wherein at least some of the lower and upper sleeve segments are arc-shaped, such that cavities formed in the tire by the lower and upper sleeve segments are arranged in arc-shaped patterns.

14. A mold assembly for molding a non-pneumatic tire, the mold assembly comprising:
    a lower mold portion including:
        a lower backing plate;
        a plurality of lower projections extending from the lower backing plate, wherein the lower projections are arranged in a first predetermined pattern to correspond to a pattern of cavities in a first side of the tire;
        a plurality of lower sleeves configured to at least partially cover the lower projections, the lower sleeves having an external surface and an internal recess having an internal surface, wherein the internal surface of the lower sleeves is shaped substantially similar to an external surface of the lower projections, and the external surface of the lower sleeves corresponds substantially to an external surface of the cavities in the first side of the tire; and at least one lower retention plate configured to be positioned proximate the lower backing plate and retain the lower sleeves on the lower projections;

an upper mold portion associated with the lower mold portion;

a hub between the lower mold portion and the upper mold portion; and a circular barrier between the lower mold portion and the upper mold portion, wherein the hub and the circular barrier provide respective seals between the lower mold portion and the upper mold portion.

15. The mold assembly of claim 14, wherein the upper mold portion includes:

an upper backing plate;

a plurality of upper projections extending from the upper backing plate, wherein the upper projections are arranged in a second predetermined pattern to correspond to a pattern of cavities in a second side of the tire; and a plurality of upper sleeves configured to at least partially cover the upper projections, the upper sleeves having an external surface and an internal recess having an internal surface, wherein the internal surface of the upper sleeves is shaped substantially similar to an external surface of the upper projections, and the external surface of the upper sleeves corresponds substantially to an external surface of the cavities in the second side of the tire.

* * * * *